Nov. 23, 1937.  C. A. FOURNESS  2,099,931
TAMPON
Filed April 15, 1935
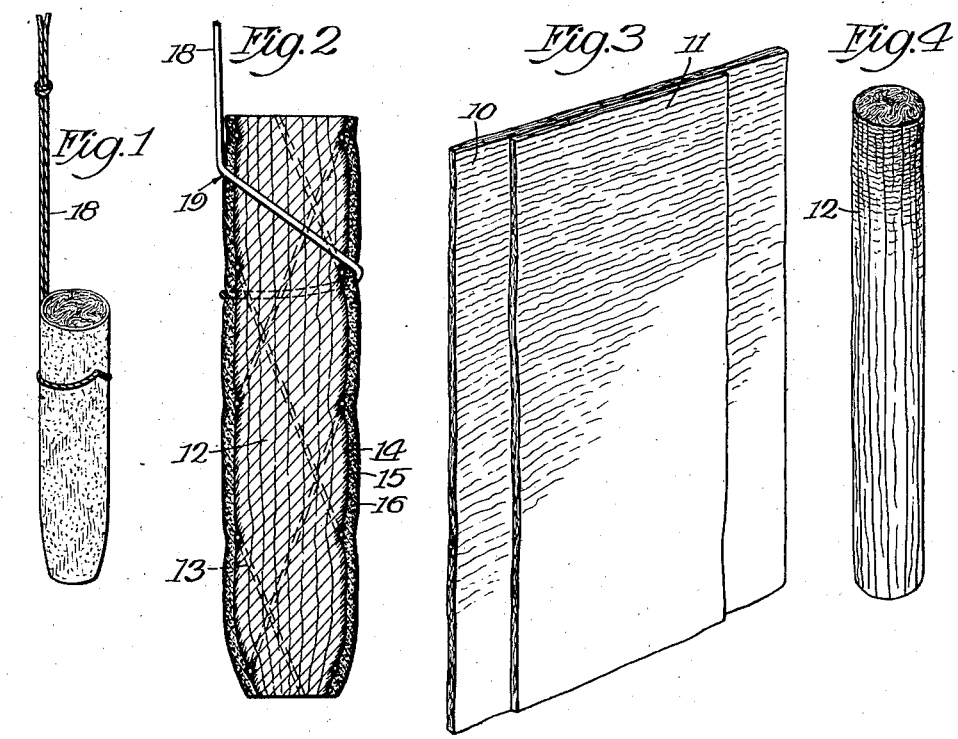
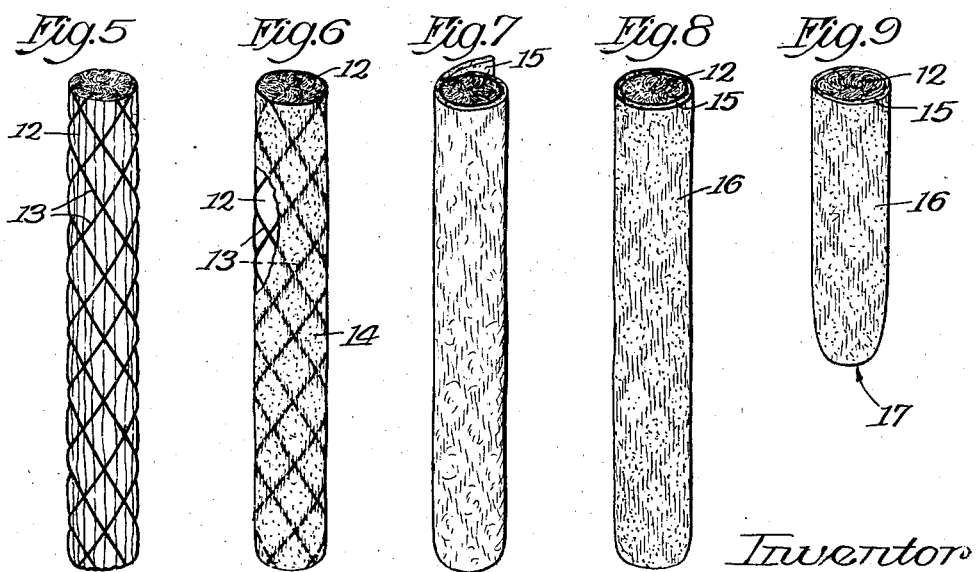
Inventor
Charles A. Fourness
By Fisher, Clapp, Soans & Pond
Attys.

Patented Nov. 23, 1937

2,099,931

UNITED STATES PATENT OFFICE 2,099,931

TAMPON

Charles A. Fourness, Appleton, Wis., assignor to International Cellucotton Products Company, Chicago, Ill., a corporation of Delaware Application April 15, 1935, Serial No. 16,321

8 Claims. (Cl. 128—285)

This invention relates to improvements in tampons in the field of catamenial appliances.

The main objects of the invention are to provide a tampon of the type referred to which will have a greater capacity for absorption than tampons of the same general type which have heretofore been known; to provide such a tampon which, because of its greater capacity for absorption may be made considerably smaller and hence easier to insert and more comfortable to use; to provide a tampon which has an initial stiffness or rigidity to facilitate its insertion but which under the influence of natural moisture and warmth, will soften and conform to the cavity; to provide a tampon which will be non-irritating and which will effectively hold itself together so as to be easily removable without leaving portions thereof in the cavity; and in general, it is the object of this invention to provide an improved tampon of the class referred to.

Other objects and advantages of the invention will be understood by reference to the following specification and accompanying drawing, in which there is illustrated a tampon embodying a selected form of the invention.

In the drawing:

Fig. 1 is a perspective;

Fig. 2 is a longitudinal section through the axis of the tampon; and

Figs. 3 to 9 inclusive are perspectives illustrating successive stages in the production of the improved tampon.

Referring now to the drawing, the improved tampon illustrated in Figs. 1 and 2 is preferably made mainly from absorbent cellulose wadding, the latter being preferably in the form of sheets or strips, as indicated in Fig. 3. In the present instance, the tampon illustrated is made from two strips of creped tissue paper (cellulose wadding) one strip 10 being wider than the other strip 11. It may, however, be made of one or more single or multi-ply strips. In effect, the described wide and narrow strip arrangement constitutes a multi-ply strip. The grain or direction of fiber in the strips is preferably lengthwise of the strips and the creping in the strips is preferably transversely of the direction of the fiber or grain. The strips 10 and 11 are drawn from supply rolls or the like and they are passed through suitable devices whereby the strips are gathered together to form an approximately cylindrical strip or cord 12, such as indicated in Fig. 4. The strips are not rolled tightly but are gathered or bunched in such a way that the cord formed therefrom is fairly soft and compressible. The cord thus embodies a multiplicity of air cells or tube-like formations which have a material capillary effect which has considerable bearing on the absorbency of the article.

The cord 12 is next passed through a braiding machine which applies a very open mesh braid to the cord, so that the cord will appear substantially as illustrated in Fig. 5. The braid indicated at 13 is of an open-mesh which may be in the neighborhood of say two or three to the inch. One purpose of the braid is to bond the core 12 in its cylindrical shape and to prevent it from spreading or opening up. The threads forming the braid embed themselves somewhat into the core 12 so that the surface of the cord becomes somewhat irregular. Owing to the embedment of the threads, they produce no harshness or irritating effect, since they cannot come into direct contact with the surface of the cavity in which the tampon is inserted.

Instead of a braided cover, a cover of gauze or other suitable textile fabric may be employed. Another important function of the braid or gauze cover is to provide strength to permit pulling of the core through forming mechanism. This function may also be served by means of threads or strings applied to the core so as to extend longitudinally thereof. Such strengthening thread or string may be enclosed within or positioned on the surface of the core, and if more than one such thread or string is used they are preferably arranged in approximately equally spaced relation if disposed on the outside of the core. Such threads or strings, like gauze or braid covering, may be effectively attached to the core by means of a layer of thick starch.

The braid or gauze covered core is next coated with a thick adhesive solution, preferably starch. Such starch coating, when dried, adds considerable rigidity to the core and it also tends to fill in the irregularities of the core surface including the irregularities formed by the embedded braiding. The core when coated appears substantially as illustrated in Fig. 6, wherein the coating is designated 14. Because of the thickness of the coating when applied, it does not materially penetrate the absorbent core 12. Hence there is no material loss of absorbency incident to the use of the starch coating.

Before the coating 14 dries, a wrapper 15 of soft, fibrous textile material, preferably cotton, is wrapped around the starched core. The starch covering being adhesive, serves to effectively secure the cotton wrapper to the core and the wrapper serves to provide a soft smooth and more or less slippery surface for the article.

After the cotton wrapper is applied, it is impregnated with a very thin starch solution. The starch causes the cotton fibers to adhere to one another and prevents the soft cotton from picking away and sticking to the moist surfaces of the cavity in which the tampon is inserted. It also serves to facilitate attachment of the cotton to the core by said thick starch layer and to secure the edges of the cotton strip together to prevent peeling at such edges. Only a small amount of starch is used for impregnating the cotton so that the latter is not made harsh. The thin starch is indicated in Fig. 8 of the drawing by light stippling and designated 16.

In some cases, but more especially when a gauze or other cover which is formed independently of the core is employed, the cover may have the thick starch solution applied to it before such cover is applied to the core. Also, if such independently formed covers are employed, the cotton wrapper may be applied to the starched cover and the two elements simultaneously applied to the core. Various other modifications in the described procedure may of course be made, but the processes described appear preferable.

When the cord is completed to the extent described, suitable lengths for making individual tampons are cut therefrom. One end of each length is moistened and subjected to a molding operation which points or rounds the end, substantially as indicated at 17 in Fig. 9. If desired, one end of such a length may be inserted into a mold to which a few drops of water have been added. The water will of course immediately be taken up by the inserted end of the cord length so as to soften the same and permit it to conform to the shape of the mold.

The pointed length of the cord is next provided with a draw-string indicated at 18 in Figs. 1 and 2. The draw-string is preferably in the form of a loop which has its looped end disposed around the unpointed end portion of the tampon. The two sides of the looped draw-string are then brought together, reverted relative to the looped portion around the tampon and passed approximately diametrically and preferably diagonally through and toward the adjacent end of the tampon so as to extend outwardly from the tampon, as indicated at 19 in Fig. 2.

Because of the high capacity for absorption of cellulose wadding material comprising the main body of the tampon, the described tampon construction may be made considerably smaller than tampons formed of other materials, while having at least as great, if not a greater, absorbent capacity. The smaller size possible with the described construction obviously adds materially to the comfort of the wearer. The layer of thick starch, while adding rigidity to the device, becomes soft under the influence of moisture and warmth so that the tampon will readily conform to the cavity so as to further enhance the comfort characteristic of the device. The soft cotton covering overcomes the harshness of the starch and the very thin outer starch coating prevents the cotton from picking away, fraying or fuzzing up and also effectively prevents the tampon from sticking to the moist surfaces of the cavity. Thus the structure described accomplishes the main objects of the invention above mentioned.

The steps in the manufacture of the article are all comparatively simple steps which may be performed almost entirely automatically, with comparatively simple mechanism. Thus the article may be produced at a reasonably low cost.

Changes in the described structure may be made without departing from the spirit of the invention, the scope of which should be determined by reference to the following claims, the same being construed as broadly as possible consistent with the state of the art.

I claim:

1. A tampon of the class described comprising an elongated core formed of absorbent cellulosic sheet material gathered to form a cord-like length, an open-mesh braid applied to said core to maintain the same in said cord-like condition and to strengthen the same against breakage from longitudinal tension, a coating of starch on substantially the surface only of said core and braid, said coating serving to stiffen the core and tending to fill in irregularities in the surface of the core, a covering of permeable cotton secured to said core by said coating, and a sizing of starch on said cotton covering.

2. A tampon of the class described, comprising an elongated core formed of absorbent cellulosic material, an open mesh fabric encircling said core and strengthening the same against breakage from longitudinal tension, a moisture pervious coating of adhesive material on substantially the surface only of said core and said fabric, and a covering of smooth fibrous material secured to said core by said adhesive material.

3. A tampon of the class described, comprising an elongated core formed of absorbent cellulosic material, an open mesh fabric encircling said core and strengthening the same against breakage from longitudinal tension, a covering of smooth fibrous material on said core and said fabric, and a moisture permeable sizing on said covering.

4. A tampon of the class described, comprising an elongated core formed of absorbent cellulosic material, an open mesh braid encircling said core and strengthening the same against breakage from longitudinal tension, a moisture pervious coating of adhesive material on substantially the surface only of said core and said braid, a covering of soft, smooth textile material secured to said core and said braid by said adhesive material, and a sizing of moisture permeable material on said covering.

5. A tampon of the class described, comprising an elongated core formed of absorbent cellulosic sheet material gathered to form a cord-like length, an open-mesh braid applied to the surface of said core to bond the same in cord-like condition and to strengthen the same against breakage from longitudinal tension, a thick starch coating covering said core and braid, a covering of soft textile material enclosing said core and braid and secured thereto by said coating, and a thin starch sizing on said textile covering.

6. A tampon of the class described, comprising an elongated core formed of a strip of cellulosic material creped transversely and with the grain of said strip disposed lengthwise of said core, a coating of adhesive material on said core, and a covering of smooth, fibrous material secured to said core by said adhesive material.

7. A tampon of the class described, comprising a core, said core consisting of a wide and a relatively narrow strip of cellulosic material creped transversely and with the grain of said strip disposed lengthwise of said core, a coating of adhesive material on said core, a covering of smooth, fibrous material secured to said core by said adhesive material, and a sizing of moisture permeable material on said covering.

8. A tampon of the class described, comprising an elongated core formed of a composite roll of cellulosic material comprising strips creped transversely and with the grain of said strips disposed lengthwise of said core, a moisture pervious coating of adhesive material applied to and substantially on the surface only of said core, and a covering of smooth, fibrous material secured to said core by said adhesive material.

CHARLES A. FOURNESS.